Aug. 6, 1963

J. E. LYDLE 3,100,011

TIRE CHANGING TOOL

Filed Aug. 18, 1960

INVENTOR.
JOHN E. LYDLE

BY William Cleland

ATTORNEY

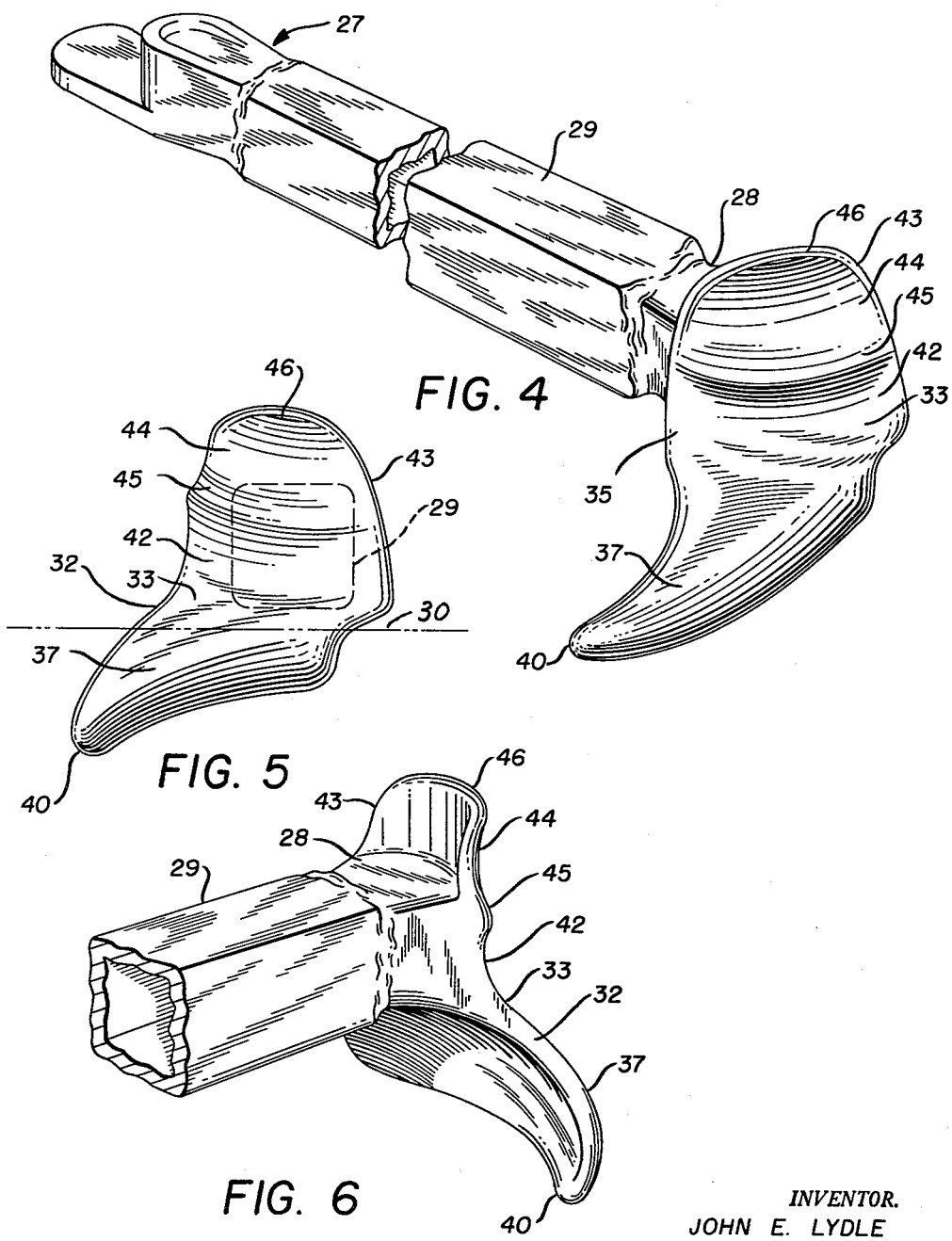

United States Patent Office 3,100,011
Patented Aug. 6, 1963

3,100,011
TIRE CHANGING TOOL
John E. Lydle, 455 Delaware Ave., Akron 3, Ohio
Filed Aug. 18, 1960, Ser. No. 50,506
4 Claims. (Cl. 157—1.22)

This invention relates to tire changing equipment, and in particular to a tool for mounting pneumatic tires with respect to drop-center rims thereof.

Heretofore, tools have been provided for mounting tires on drop-center rims affixed on a rotatable table of a tire changing machine, the tool including a lever arm rotatable about a post centrally of the table, and having a work-engaging part adapted to guide a tire bead around the rim flange to position on the respective bead seat on the rim. These tools have been objectionable for various reasons, such as that they were inefficient or inoperative for use on modern tubeless tires, or that they had a strong tendency to scuff or tear rubberized air-sealing portions of the tire bead, thereby to destroy the effectiveness of the air-seal against the corresponding rim portions.

One object of the invention is to provide a lever-type tire mounting tool of the character described which is easily operable as by fulcruming the same as a lever against a said central post of a tire-changing machine, to move an improved work-engaging part in an arc progressively to guide the tire bead inwardly past the respective rim flange, without scuffing contact of the bead with the rim flange which would otherwise be likely to damage the rubberized air-sealing portions of the bead.

Another object of the invention is to provide a tire mounting tool of the character described in the preceding object, wherein, improved means is provided at the leading end of the work-engaging part of the tool to pick up or lift the tire bead past the lip of the rim flange, and also to engage the last short extent of tire bead opposing forward operation of the tool, all without scuffing or pinching engagement of the bead with the rim flange as said last short extent of tire bead is forced around said lip.

Still another object of the invention is to provide an improved tire mounting tool having the features set forth in the preceding objects of the invention, and which additionally is adapted simultaneously to guide both beads of a pneumatic tire inwardly past the rim flange with substantially the same amount of easy effort as would be required for similarly operating upon either one of said tire beads separately.

Other objects of the invention will be manifest from the following brief description and the accompanying drawings.

Of the accompanying drawings:

FIGURE 4 is a perspective view, partly broken away on the same scale as FIGURES 2 and 3, illustrating the improved bead-engaging tool apart from the tire changing machine.

FIGURE 5 is an end view looking inwardly endwise of the work-engaging end of the tool.

FIGURE 6 is a fragmentary perspective view of the same, looking in the opposite direction.

This application is a continuation in part of co-pending application Serial Number 668,970, filed July 1, 1957, resulting in Patent Number 3,050,110.

Figure 1:
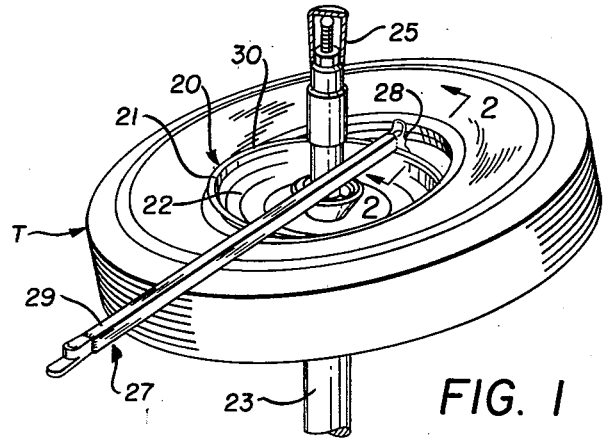
FIGURE 1 is a top plan view, partly broken away, illustrating a tire-changing machine of known type with a tubeless tire being shown in a position for having both beads thereof urged inwardly of a rim flange of a tire wheel by means of the tire mounting tool of the invention.
Figure 2:
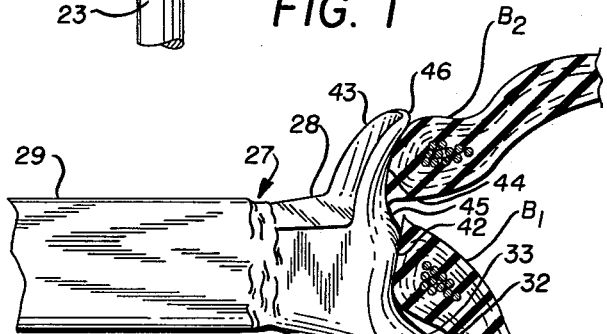
FIGURE 2 is an enlarged vertical cross-section taken substantially on the line 2—2 of FIGURE 1, illustrating operation of the tire-mounting tool simultaneously to urge two beads of a tubeless tire over the rim flange.
Figure 3:
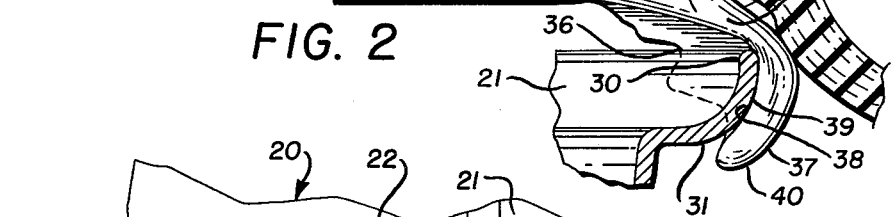
FIGURE 3 is a top plan view, partly broken away, illustrating the improved tire-mounting tool in the relative position shown in FIGURES 1 and 2, but with the tire removed.
Figure 3:
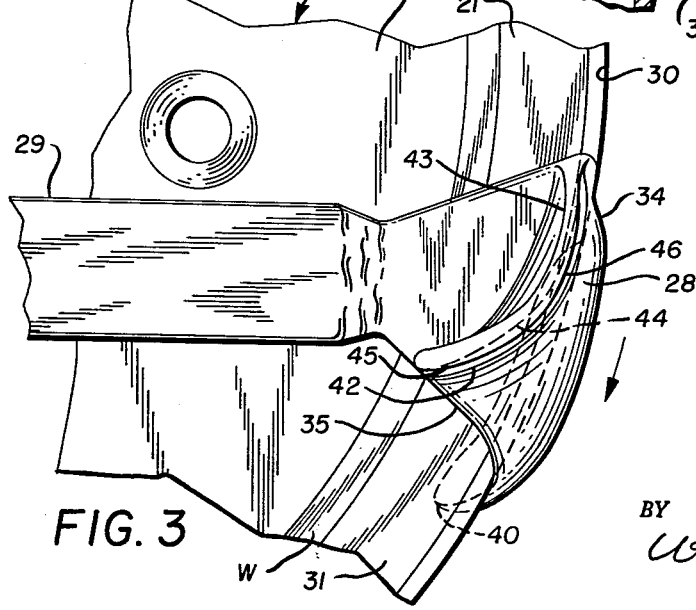

Referring generally to FIGURES 1 to 6 and to FIGURES 1 to 3 in particular, the numeral 20 designates a vehicle wheel of known type, including a drop-center rim 21 welded or otherwise permanently secured to a centrally apertured disc or hub plate 22. The wheel 20 is shown fixedly supported in horizontal position on the upper end of a tubular post 23 of a tire-changing machine or stand of known type as for mounting a tubeless tire T in the drop-center rim 21. For removably mounting the wheel 20 on post 23, there may be provided a separate adaptor post 25 of a removable type shown in the aforementioned co-pending application, and which includes suitable means for preventing rotation of the wheel relatively of post 23. FIGURE 1 shows a tubeless tire T in an initial, manually mounted position on the drop-center rim 20, and with the improved tire-mounting tool 27 of the invention positioned to complete the tire mounting operation.

The tire tool 27 may have a bead guiding shoe 28 integrally formed on one end of an elongated lever bar 29 to ride on the upwardly presented edge 30 of rim flange 31, at a fixed radius from the axial center of the rim. A base portion or element 32 of the shoe 28 may have an upwardly convex or rounded guide face 33 of more or less triangular shape, and having an apex point 34 at a trailing end thereof, approximately in line with a corresponding trailing side of the bar 29, and a broad leading edge 35 forwardly of said apex with respect to the clockwise direction of travel of the shoe for mounting a tire T on the rim, as indicated by an arrow in FIGURE 3.

The underside of base portion 32 may have arcuately disposed, relatively smooth portions 36, providing rim-seating means for sliding engagement with the upwardly presented outer edge 30 of the rim flange. Extending downwardly from the base portion 32, between the leading and trailing ends thereof, may be an integral downturned lug 37 for stop engagement with the radially outermost portion 38 of the rim flange when the tool handle 29 is extended substantially diametrically across the rim in fulcruming position against the post 25, as shown in FIGURE 1 and as will be described later. Lug 37 is outwardly smoothly rounded in vertical direction from a laterally arcuate outer portion of the base portion 32 which is closely coextensive with the corresponding portion of said outer peripheral edge 30 of the rim flange engaged thereby (see FIGURE 3). The inner face of the lug may be of concave shape to conform generally to said corresponding portion 39 of the rim flange, to limit radially inward movement of the shoe. A forwardly tapered extension 40 of the lug is curved downwardly and radially inwardly of the rim flange, as indicated in FIGURES 2 and 3, to facilitate smooth operation of the tool.

For guiding said taut portion of the tire bead around the peripheral edge 30 of the rim flange, an upright arcuate bead-urging face or wall portion 42 is integrally provided on the upper side of the base portion 32 to form a dihedral angle with said convex guide face 33, the wall portion 42 converging with respect to the outer edge of the base portion, rearwardly from leading edge 35 to said apex point or trailing end 34. All surfaces which are contacted by the tire bead are smoothly rounded or merged together so that there will be a minimum of frictional resistance between the same and the tire bead. The tool thus far described may be utilized to mount one or both beads of a tire separately within the rim 21, substantially in the manner described in the aforesaid co-pending patent application. The present invention, however, contemplates provision of novel means by which both tire beads $B_1$ and $B_2$ may be positioned in the rim simultaneously. To this end, the wall 42 may be provided with an upward extension or ear 43 defining a radially offset upper bead-urging face 44 which is arcuately coterminous with the lower bead-urging face 42, and which is smoothly merged with the latter through a downwardly and radially outwardly inclined shoulder or ledge 45 (see FIGURES 2 and 3). The upper portion of ear 43 may be slightly outturned at 46 to retain the upper tire bead $B_2$ in requisite position in a manner to be described later.

In the use of the improved tire tool 27 to mount a tubeless pneumatic tire T, for example, on a drop-center type rim 21, the wheel and rim assembly 20 is first releasably clamped on a tire stand of known type previously described in connection with FIGURE 1, to support the wheel in horizontal position. Next, the tire T is positioned as shown in FIGURE 1 to engage both tire beads $B_1$ and $B_2$ deeply into the usual well portion W of the rim, whereby the diametrically opposite portions of the beads will overhang the corresponding outer edge portion of the uppermost rim flange 31. As the inside diameter of the tire beads are smaller than the maximum diameter of the rim flange, the function of the tool 27 is to urge the overhanging portion of the beads inwardly past the uppermost rim flange easily and without damaging the beads.

Accordingly, the tool 27 is positioned to fulcrum against the relatively fixed post extension 25 of the tire stand while the shoe 28 is seated as previously described in connection with FIGURES 1, 2 and 3, at the point on the rim edge 30 where the tire beads overhang the same (see FIGURES 1 and 2), in which case the upper and lower beads $B_2$ and $B_1$ may be made to engage against the upper and lower bead-urging faces 44 and 42, respectively, of the shoe 28, whereby the shoe is maintained inwardly against the rim flange by the inherent resilient pressure of the more or less taut overhanging portions of the tire beads (see FIGURE 1). In this condition, the lever arm 29 is manually fulcrumed against post extension 25 to slide the shoe 28 arcuately around the rim flange in the clockwise direction as indicated by the arrow in FIGURE 3, thereby progressively to guide and gently urge both tire beads radially outwardly and axially inwardly around the edge 30 of the rim at the apex point 34 (see FIGURE 3). Clockwise sliding movement of the shoe is continued until the entire overhanging or taut portions of the upper and lower beads have been urged inwardly past the peripheral edge of the rim. During this operation the forwardly tapering and inwardly curved extension of said lug 37 assures smooth operation of the tool without pinching the pressure-sealing rubber of the beads, particularly in final stages of movement of the beads over the edge 30 of the rim flange. Upon removal of the tool 28 from the rim the beads are seated in the rim seats in known manner.

While the operation has been described for simultaneously positioning two beads of a tire in a drop-center type rim, it is to be understood that the improved tool may be utilized for so positioning the respective beads one at a time.

Modification of the invention may be resorted to without departing from the spirit thereof or the scope of the appended claims.

What is claimed is:

1. A tire tool as for mounting a pneumatic tire casing on a wheel supported on a relatively fixed supporting device to have at least one outwardly curving peripheral flange of the rim terminating in an axially outwardly presented peripheral edge, comprising a tire bead-engaging element having leading and trailing ends and axially opposed top and bottom sides, said bottom side adapted to be in sliding engagement with said pheripheral edge of the rim, said top side having an axially outwardly presented guide face extending to a radially outwardly presented outer portion which is substantially coextensive with the engaged portion of said peripheral edge of the rim, said element having on the top side thereof a wall providing a radially outwardly presented bead-urging face generally at a dihedral angle to said guide face of said element, said bead-urging face being forwardly divergent with respect to said outer portion from a point adjacent the trailing end of the element to a leading portion of the same of substantial breadth, said element having a downturned angular extension from said outer portion adapted to conform to the radially outwardly presented peripheral portions of the rim flange and tending to limit radially inward movement of the element upon yielding engagement of the tire bead with said bead-urging face, and turning means on said element for sliding the same around said peripheral edge of the rim, said downturned angular extension being concavo-convex with the convex side as a smoothly rounded continuation of said guide face, said concavo-convex extension being adapted to conform radially inwardly to said curving peripheral flange and the extension also including a rounded terminal end presented forwardly of said leading end of the element and to be inturned to a substantial extent with respect to said peripheral edge of the rim flange.

2. A tire tool as for mounting a pneumatic tire casing on a wheel supported on a relatively fixed supporting device to have at least one flange of the rim terminating in an axially outwardly presented peripheral edge, comprising a tire bead-engaging element having leading and trailing ends and axially opposed top and bottom sides, said bottom side adapted to be in sliding engagement with said peripheral edge of the rim, said top side having an axially outwardly presented guide face extending to a radially outwardly presented outer portion which is substantially coextensive with the engaged portion of said peripheral edge, said element having on the top side thereof, a wall providing a radially outwardly presented bead-urging face generally at a dihedral angle to said guide face of said element, said bead-urging face being forwardly divergent with respect to said outer portion from a point adjacent the trailing end of the element to a leading portion of the same of substantial breadth, and means for limiting radially inward movement of the element to the rim upon yielding engagement of the tire bead with said bead-urging face, said element having means thereon for sliding the same around said peripheral edge of the rim, said wall having an upward extension defining an upper bead-urging face radially inwardly offset with respect to the lower aforesaid bead-urging face to provide an upwardly presented shoulder portion, whereby upon forward sliding movement of said element the upper and lower beads of the tire are adapted to be simultaneously and progressively engaged by the upper and lower bead-urging faces, respectively, to guide both beads inwardly around said peripheral edge of the rim.

3. A tool as set forth in claim 2, said means for limiting including a downturned continuation of said top side of the element and a radially inturned portion meeting therewith along a rounded juncture area of the same which follows the curving shape of the rim flange to a rounded terminal end of the angular extension forwardly of said leading end of the element and inwardly of the peripheral edge of the corresponding rim flange.

4. A tool as set forth in claim 2, said upper bead-urging face having an out-turned portion overhanging said shoulder portion to define therewith a concave bead-retaining recess tending to keep the upper and lower beads separated.

References Cited in the file of this patent

UNITED STATES PATENTS

| | | |
|---|---|---|
| 2,201,982 | Bazarek | May 28, 1940 |
| 2,655,985 | Henderson | Oct. 20, 1953 |
| 2,873,777 | Thostenson | Feb. 17, 1959 |
| 2,900,775 | Harrison | Aug. 18, 1959 |
| 2,974,722 | Twiford | Mar. 14, 1961 |

FOREIGN PATENTS

| | | |
|---|---|---|
| 787,775 | Great Britain | Dec. 18, 1957 |